Figure 1:
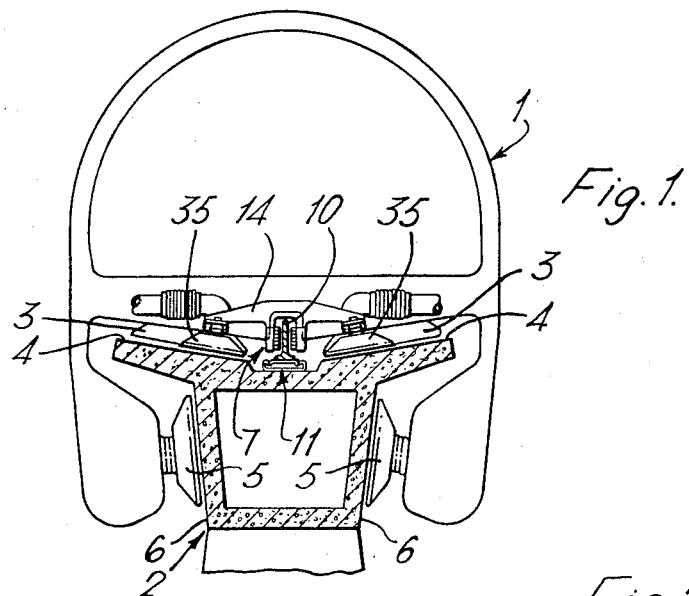

318-135.
08-01-72    XR    3,680,489

United States Patent
English

[15] 3,680,489
[45] Aug. 1, 1972

[54] VEHICLE PROPELLED BY LINEAR MOTOR

[72] Inventor: Christopher Durrant English, Burwell, England

[73] Assignee: Tracked Hovercraft Limited, London, England

[22] Filed: March 20, 1970

[21] Appl. No.: 21,273

[30] Foreign Application Priority Data

March 21, 1969 Great Britain.........15,137/69
March 21, 1969 Great Britain.........15,138/69
March 21, 1969 Great Britain.........15,139/69

[52] U.S. Cl. .......104/148 LM, 104/23 FS, 180/7 FS, 310/12, 318/135
[51] Int. Cl. ............................................B61l 13/00
[58] Field of Search......104/148 LM, 23 FS, 147, 23; 180/7 FS; 310/12, 13; 318/135, 38, 22

[56] References Cited

UNITED STATES PATENTS 3,460,485    8/1969    Easton...................104/148 LM
3,500,765    3/1970    Easton et al. ..........104/148 LM

*Primary Examiner*—Arthur L. La Point
*Assistant Examiner*—Richard A. Bertsch
*Attorney*—Cameron, Kerkam and Sutton

[57] ABSTRACT

A vehicle for operation along a prepared track has a double-sided linear induction motor stator for propelling the vehicle by co-operation with a reaction plate forming part of a reaction rail extending along the track. The stator is connected to the vehicle body by a linkage which is capable of transmitting only a longitudinally directed force such as the stator tractive force, and is guided by guide means which co-operate with the reaction rail preferably between the reaction plate and the track and which are so arranged as to be incapable of transmitting any substantial rolling moment to the reaction rail. Stator support and roll control is effected separately from the stator guidance.

18 Claims, 5 Drawing Figures

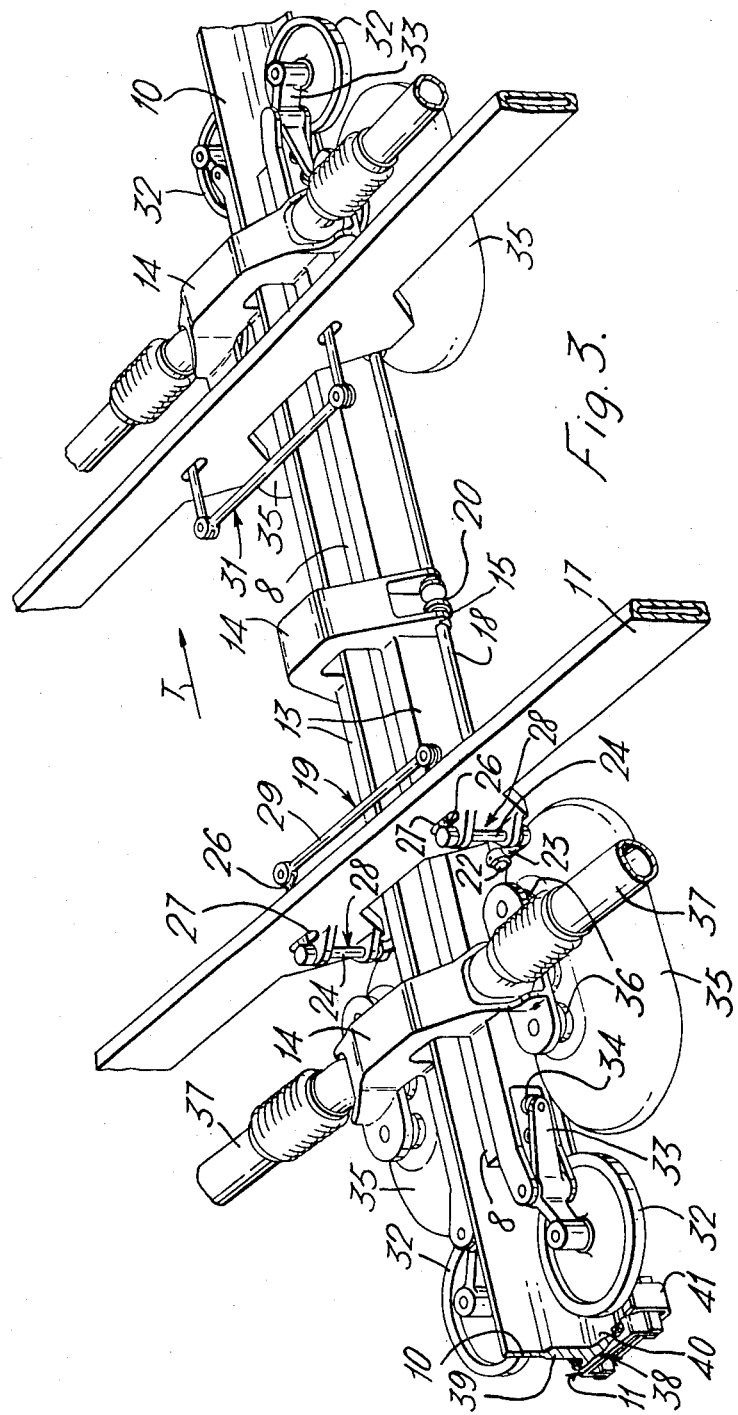

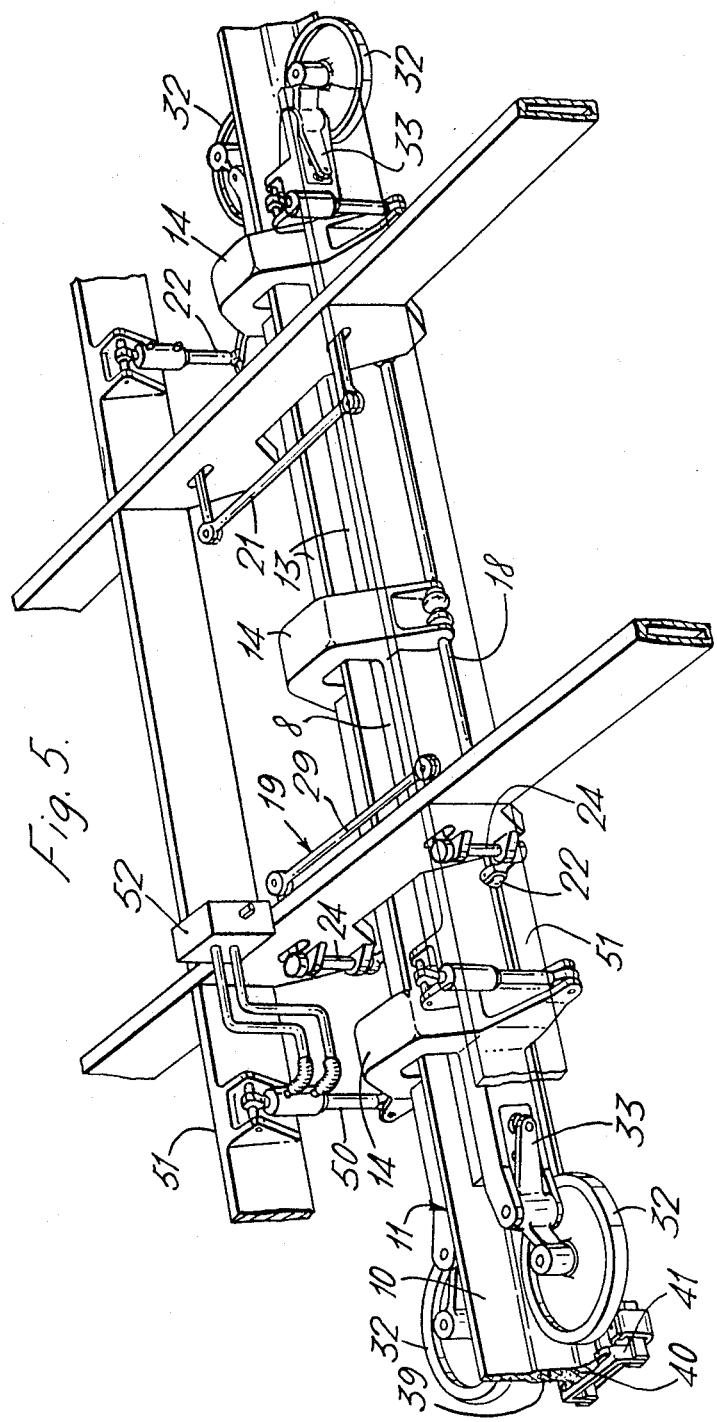

VEHICLE PROPELLED BY LINEAR MOTOR

This invention relates to a vehicle, in particular an air cushion vehicle, which in operation is propelled along a prepared track by a linear induction motor of which the primary member, hereinafter to be referred to as the "stator", is carried by the vehicle and the secondary member or "rotor" is provided by an electrically conductive reaction plate mounted on the track.

It has been proposed for vehicle to provide a double-sided stator, that is to say, a stator having two interconnected parts which for operation are arranged to embrace in spaced relationship the reaction plate extending between them. The invention concerns vehicle having such a stator arranged for co-operation with a generally vertical reaction plate forming part of a reaction rail mounted on the track.

The body of the vehicle is movable relatively to the track in directions other than the longitudinal direction. These other movements can be substantial. However, the movement of the stator laterally of the track is limited to the spacing of the stator parts minus the thickness of the reaction plate between them. For acceptable induction motor efficiencies this amount of allowable movement is considerably smaller than the corresponding movement of the vehicle body relative to the track.

In view of the above it is necessary to mount the stator so that laterally of the track it is movable relative to the vehicle body, and to guide the stator separately from the guidance provided for the vehicle body itself.

It is desirable to use the reaction rail for such stator guidance, but this creates difficulties so far as the reaction rail is concerned.

Previous arrangements of vehicles which use a reaction rail for stator guidance have been unsatisfactory because the need for the reaction rail to withstand the stator guidance forces has imposed on the design of the reaction rail restraints which are not compatible with high induction motor efficiencies. It is an object of the present invention to provide vehicle in which stator guidance may be provided by the associated reaction rail in a more satisfactory manner than has previously been possible.

According to an aspect of the present invention, vehicle for operation along a prepared track comprises a double-sided linear induction motor stator for propelling the vehicle by electro-magnetic co-operation with a generally vertical, electrically conductive and non-magnetic reaction plate forming part of a reaction rail mounted on the track, means connecting the stator to the vehicle body for independent movement with respect thereto except in a longitudinal direction, guide means carried by the stator and adapted for co-operation with the reaction rail for maintaining the stator substantially at a predetermined lateral position relative to the reaction rail, the guide means being arranged so as to be incapable of transmitting any substantial rolling moment to the reaction rail, support means for supporting the stator, and roll control means for providing the stator with stability in roll.

Arranging that stator roll control is provided by means other than the stator guide means and that the stator guide means itself are incapable of transmitting any substantial stator rolling moment to the vehicle body gives several advantages. An important one of these advantages is that the reaction rail functions of providing for induction motor operation and providing for stator guidance can be satisfactorily separated from one another.

According to a preferred feature of the present invention the vehicle is arranged for the guide means to co-operate with the reaction rail between the reaction plate and the track.

Preferably the guide means comprise a plurality of wheels carried by the stator and adapted to run on opposed side surfaces of the reaction rail in a common plane of contact between the reaction plate and the track.

Preferably the support means and roll control means are provided by the same devices. These may, for example, comprise laterally spaced air cushion pads carried by the stator and arranged to co-operate with track surfaces on either side of the reaction rail, or they may comprise generally vertical connections pivotally connected between the stator and the vehicle body on each side of the reaction rail and controllable differentially or in unison by associated control means.

Figure 2:
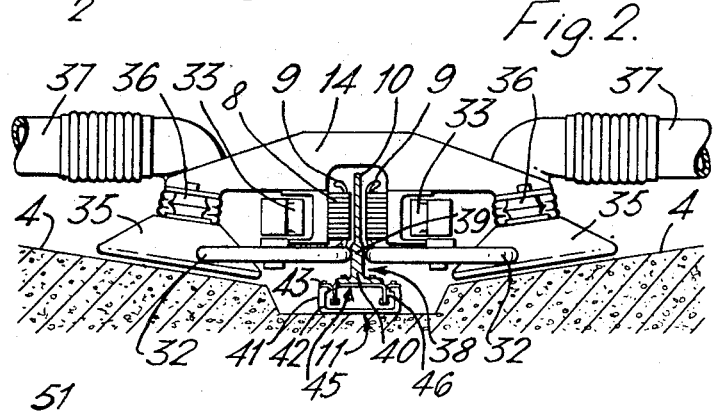
Figure 4:
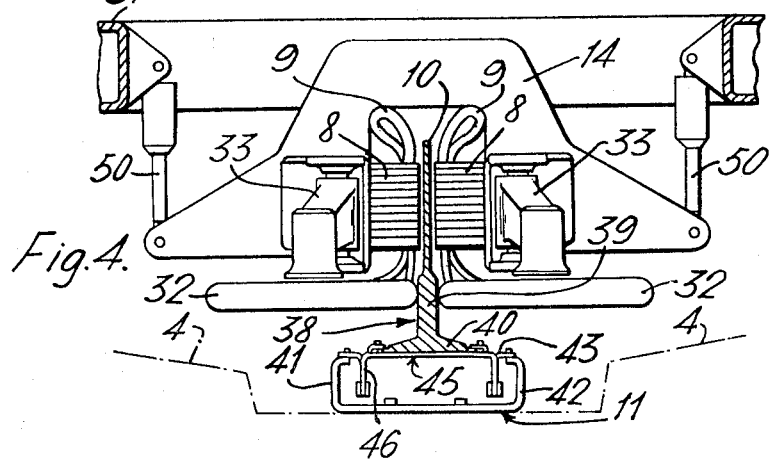

In order that the invention may be more fully understood, two air cushion vehicles in accordance with the invention will now be described, by way of example, with reference to the accompanying drawings in which:

FIG. 1 shows in simplified cross section the general arrangement of the first air cushion vehicle in operation, FIG. 2 shows in greater detail the support, roll control and guidance means provided for the double-sided linear induction motor stator of the first air cushion vehicle, FIG. 3 is a perspective view of a part of the first air cushion vehicle, FIG. 4 shows the support, roll control and guidance means for the double-sided linear induction motor stator of the second air cushion vehicle, and FIG. 5 is a perspective view corresponding to FIG. 3 of part of the second air cushion vehicle.

Referring now to FIGS. 1, 2 and 3, an air cushion vehicle 1 is arranged for operation along a prepared concrete track 2 having a cross section generally in the form of an upright T. The body of the vehicle is supported above the track by longitudinally spaced pairs of air cushion support pads 3 (of which one pair is shown) co-operating with the top of the track at generally horizontal support surfaces 4 through the medium of cushions of pressurized air which they form and maintain. Likewise, the vehicle body is guided along the track by longitudinally spaced pairs of air cushion guidance pads 5 co-operating with generally vertical guidance surfaces 6 provided by the leg of the track.

For passenger comfort, each air cushion pad 3 and 5 is flexibly carried from the vehicle body, so as to provide a relatively soft suspension which is secondary to the hard primary suspension constituted by the supporting and guiding air cushions.

For propulsion the vehicle body is connected to a double-sided linear induction motor stator 7 having two opposed and longitudinally extending magnetic structures 8 (FIG. 2) each formed with a three-phase winding 9 and arranged to embrace in spaced relationship an electrically conductive and nonmagnetic reaction plate 10 mounted generally vertically on the track perpendicular to the support surfaces 4. The reaction plate 10 forms part of a reaction rail 11 of which the arrangement is later to be described in detail.

FIG. 3 shows the stator 7 in greater detail and indicates how it is attached to the vehicle body. Referring now in particular to FIG. 3, the magnetic structures 8 are attached to a carriage formed of two backing members 13 integrally connected together by three longitudinally spaced yokes 14.

Adjacent the center one of these yokes 14, each backing member 13 is formed with a lug 15 at each side of the carriage, and these lugs form connection points at which the stator is connected to a cross member 17 of the vehicle body by two longitudinally extending drag links 18 forming part of a linkage 19 now to be described.

The drag links 18 are terminated beyond the lugs 15 by rubber thrust pads 20 and extend loosely through the lugs to their other ends. On these other ends the drag links are pivotally connected at 22 to inwardly directed arms 23 carried by pivot spindles 24. The pivot spindles 24 are each journaled for rotation about a vertical axis at a respective connection point on the vehicle body provided by the cross member 17, and carry at their top ends further arms 26 which are directed away from the cross member 17 in the direction of, and generally parallel to, the associated drag links 18. Slots 27 are formed in the cross member 17 to accommodate the arms 26. Each spindle 24 and its associated arms 23 and 26 constitute a crank which is generally indicated in the drawings by the reference numeral 28.

At their ends the arms 26 are rotatably interconnected by a cross link 29 extending transversely of the motor.

In operation the windings 9 are energized from a three-phase supply and in known manner each magnetic structure 8 generates a magnetic field which travels longitudinally of the motor in the direction of the arrow T (FIG. 3). The magnetic fields due to the two structures are additive and combine together to create magnetic flux which passes between and along the structures 8 in a series flux path which is directed longitudinally of the motor and which passes twice through the reaction plate 10. In passing through the reaction plate the flux induces currents to flow in the plate, and these currents interact with the flux to produce propulsive force in the direction of the arrow T.

The linkage 19 is provided to transmit this tractive force to the vehicle body. Assuming for the moment that the stator and the vehicle body are aligned with one another, the tractive force is transmitted equally by the drag links 18 in tension, the cranks 28 being stationary and held in symmetry (as shown) about the longitudinal center line of the stator by the cross link 29 in tension. It will be noted that the drag links are coplanar with the line of action of the tractive force so that little or no tilting moment is exerted on the stator by the tractive force.

The primary and secondary suspensions previously described allow the vehicle body to undergo relative movement with respect to the track other than the desired movement along the track. Five such movements are possible, and these are: translational movement in the lateral direction; translational movement in the vertical direction ("heaving"); rotational movement about a horizontal transverse axis ("pitching"); rotational movement about a vertical transverse axis ("yawing"); and rotational movement about a longitudinal axis ("rolling").

The linkage 19 is substantially incapable of transmitting any of these five movements of the vehicle body relative to the track to the induction motor stator. The two translational movements and the pitching and rolling movements are accommodated by small swinging movements of the drag links 18 pivoting at their ends. To allow this pivotal movement the rubber thrust pads 20 have spherical faces for engaging corresponding spherical faces formed on the lugs 15, and the pivotal connections 22 are of the universal variety.

A yawing movement of the vehicle body relative to the track is accompanied by adjustment of the linkage 19 as follows. Supposing, for example, that a cross wind or other disturbance exerts on the vehicle body a force such that relative to the track the cross member 17 is urged to rotate in a horizontal plane and clockwise as seen in FIG. 3; the linkage 19 is thus subjected to an unbalance force which is superimposed upon the tractive force transmitted equally by the two drag links 18 and which is in a sense to cause the cranks 28 to rotate in clockwise senses. In response to the unbalance force, the cranks rotate in a clockwise sense until they adopt an angular position appropriate to the magnitude of the yawing movement of the vehicle body. The pivotal mountings and connections involved in the linkage 19 are of low frictional resistance so that the unbalance force is not allowed to attain a large value, and the position eventually adopted by the cranks is such that the forces in the two drag links are again equal.

In order to brake the vehicle, the stator 7 may be reconnected in a plugging or regenerative mode, and a second linkage 31 identical to the linkage 19 is arranged back-to-back with the linkage 19 as shown in order to transmit the braking force to the vehicle body by substantially equal forces in its two drag links, in an identical manner to the transmission of tractive force by the linkage 19. During braking the linkage 19 is inoperative as is the linkage 31 during propulsion.

To summarize the above description, each linkage 19 and 31 transmits between the stator and the vehicle body only force which is directed substantially longitudinally of the track. Relative movement of the vehicle body and stator in any one of the five senses mentioned above is accommodated by the linkages by swinging movement of their drag links 18 and/or by pivotal movement of the cranks 28. At all times the forces in the operative pair of drag links are maintained substantially equal.

From the above it is apparent that apart from longitudinally directed forces the stator 7 is substantially independent of the vehicle body and so is not subject to the support and guidance provided for the vehicle body by the air cushion pads 3 and 5.

Support for the stator is provided by two pairs of laterally spaced air cushion pads 35 carried from the front and rear yokes 14 by longitudinally disposed pairs of resilient joints 36. The pads 35 are supplied with pressurized air through respective ducts 37 as shown, and support the stator in known manner by co-operation with the track surfaces 4 previously mentioned. The joints 36 provide a resilient suspension for the pads 35 and allow the pads to undergo adjusting movement in roll and, to a lesser extent, in pitch.

The pads 35 which, like the pads 3 and 5, may be confined by air curtains and/or by flexible skirts, have operational characteristics such that they tend to maintain themselves at a substantially constant clearance above the co-operating track surface 4. They, therefore, support the stator for co-operation with the reaction plate 10 at a substantially constant distance from the track; also, by reason of their substantial lateral spacing on either side of the longitudinal center line of the vehicle, they stabilize the stator in roll by maintaining the stator at a substantially fixed angular position relative to, and transversely of, the track.

Stator guidance is provided independently of the stator support and roll control by wheels 32 which are vertically mounted on levers 33 pivoted at the ends of the backing members 13 and are biased into running contact with the reaction rail 11 by springs 34 disposed between the levers 33 and the associated backing members. The wheels are arranged in mutually opposed pairs and contact the reaction rail in a single horizontal plane lying between the reaction plate 10 and the track. They are, therefore, incapable of transmitting any substantial stator rolling moment to the reaction rail.

The guidance provided by the wheels 32 is such as to maintain substantially equal the air gaps between the magnetic structures 8 and the reaction plate 10. This is desirable for, inter alia, reducing the possibility of contact between the magnetic structures and the plate.

The arrangement of the stator guidance means so that they are incapable of transmitting any substantial stator rolling moment to the reaction rail has many advantages and enables the reaction rail to be more satisfactorily used for stator guidance than has hitherto been possible. Not only are the forces involved in guiding the stator along the track considerably reduced because transversely of the track they are purely translational and contain little or no component of bending moment, but also the means for providing such stator guidance may be satisfactorily arranged to co-operate with the reaction rail between the reaction plate (i.e. the electrically active part of the reaction rail) and the track, so separating from one another the reaction rail functions of producing propulsive force and providing stator guidance and reducing the bending movements produced on the reaction rail by the lateral guidance forces.

A further advantage of arranging the stator guidance means to be incapable of transmitting any substantial stator rolling moment is that the guidance means can be simpler than would otherwise be possible, since they do not have to co-operate with each of the opposed reaction rail surfaces at two or more areas of co-operation which are spaced transversely of the rail.

The reaction rail 11 is arranged as follows: the reaction plate 10 forms an integral part of a rail member 38 which is made of an electrically conductive and nonmagnetic metal such as aluminum and which comprises, in addition to the plate 10, a thickened portion 39 and a flange portion 40 remote from the reaction plate.

Because the plate 10 is not required for stator guidance, its thickness can be chosen to satisfy in an optimum manner the electrical requirements for induction motor operation.

Likewise, because the thickened part 39 forms no part of the induction motor per se, its thickness can be chosen to satisfy in an optimum manner the mechanical requirements for guiding the stator along the track and for supporting the reaction plate in free space.

The rail member 38 as a whole is supported generally in a vertical plane by a plurality of longitudinally spaced mountings 41 each disposed between the flange portion 40 of the rail member and the track 2. Each mounting comprises a rigid and generally U-shaped member 42 (FIG. 2) which is bolted to the track at its base and carries from the inturned end of each of its arms a member 43 formed with two longitudinally spaced and downwardly extending leaf springs (not visible) lying on a common plane directed longitudinally of the track.

Between the members 43 of each mounting 41 is disposed a central member 45 (FIG. 4) which is generally in the form of an inverted U and of which each of the two arms is provided by a leaf spring 46 disposed on the common plane of the leaf springs of the associated member 43. At each side of a mounting 41 and associated leaf springs are connected together at their free ends.

The rail member 38 is bolted or otherwise secured to the top of each central member 45. The modulus of elasticity of each leaf spring 46 is the same as that of the leaf springs of the associated member 43 in combination and the lengths of the leaf springs are also the same, with the result that the lateral guiding force exerted on the rail member by the wheels 32 causes substantially only lateral movement of the rail member with little or no tilting or vertical movement. This resilient mounting of the rail member 38 increases by a considerable extent the amount of reaction plate misalignment which is tolerable by the guide means.

The invention is in no way limited to air cushions for providing support and roll control for the stator by co-operation with the track. For example, in a modification of the arrangement of FIGS. 1 to 3 the air cushion pads 35 are replaced by wheels mounted on horizontal axes to run on the track. A further possible arrangement for providing stator support and roll control is shown in FIGS. 4 and 5 which show the second embodiment of the invention and with reference to which the following description is given. The first and second embodiments are in many respects similar to one another and the same reference numerals are used where appropriate.

Referring now to FIGS. 4 and 5 the second embodiment of the invention is the same as the first embodiment in so far as the prepared track, the reaction rail and the stator guidance is concerned, but differs in the stator support and roll control provided. The stator is hung from the vehicle body by four hydraulic actuators 50 corresponding generally in position (in plan view) to the air cushion pads 35 of the first embodiment. The actuators 50 are generally vertical, being pivotally supported at their top ends by beams 51 forming part of the vehicle body and being connected to the stator at their bottom ends by further pivotal connections made to lateral extensions of the front and rear yokes 14.

The actuators 50 form part of a servo-system and are controllable both in unison and differentially so as to maintain the stator along its length at a substantially constant height above the track and also to prevent the stator from undergoing any substantial rolling motion relative to the reaction rail. It will thus be appreciated that the actuators are functionally equivalent to the air cushion pads 35 of the first embodiment but support the stator from the vehicle body as opposed to from the track. Actuator control may be conventional, basically comprising sensors (not shown) for sensing the stator inclination and height relative to the track, and control gear 52 responsive to the sensor output signals for controlling the hydraulic supply to the actuators so as to maintain the stator inclination and height substantially constant.

In a modification roll control is performed by only one of the pairs of laterally spaced actuators; the other pair of actuators, preferably the pair at the front of the stator, is used only for height control.

Although the embodiments described and illustrated have stator guidance provided by wheels the invention is not so limited and other forms of stator guidance may be used. If desired air cushion pads may be used in addition to wheels for providing stator guidance by co-operation with opposed faces of the reaction rail. Desirably, stator guidance is provided wholly by air cushion pads since there need then be no contact between track and vehicle. However, this is likely to be difficult to achieve satisfactorily in practice because of the small degree of lateral movement which can be tolerated between the stator and the reaction rail.

Although the wheels and/or the stator guidance pads are preferably arranged on a common plane and on the corners of a rectangle (as shown for the wheels 32) such an arrangement is not essential; the wheels and/or pads may be not co-planar and numbers other than four (and greater than three) may be used. The arrangement is such, however, that the guide means are incapable of transmitting any substantial stator rolling movement to the reaction rail.

Stator guidance need not necessarily be performed by co-operation with the reaction rail between the reaction plate and the track, but such an arrangement is desirable because the functions of the rail to produce propulsive force and to provide stator guidance are thereby separated from one another. Using the reaction plate itself for stator guidance to some extent enables the height of the reaction rail to be reduced, but is likely to require a compromise so far as electrical requirements are concerned, with a resulting decrease in induction motor efficiency.

The arrangement shown in FIGS. 3 and 5 for connecting the stator to the vehicle body, although preferable, is not essential. The connection should, however, be such that only longitudinally directed forces can be transmitted between the stator and the vehicle body.

Although in the described embodiments of the invention, stator support and roll control are both effected by the same devices, in some arrangements in accordance with the invention these functions are performed separately of one another. The invention is not limited to air cushion vehicles having a stator adapted for co-operation with a reaction rail projecting upwardly from the associated track, but may be applied to vehicles having a stator adapted for co-operation with a downwardly depending rail.

I claim:

1. A vehicle for operation along a prepared track and comprising a double-sided linear induction motor stator for propelling the vehicle by electro-magnetic co-operation with a generally vertical and electrically conductive reaction plate forming part of a reaction rail mounted on the track, means connecting the stator to the vehicle body for independent movement with respect thereto except in a substantially longitudinal direction, guide means carried by the stator and adapted for co-operation with the reaction rail for maintaining the stator substantially at a predetermined lateral position relative to reaction rail despite substantial lateral movements of the vehicle body relative to the track, the guide means being arranged so as to be incapable of transmitting any substantial rolling moment to the reaction rail, support means for supporting the stator substantially at a predetermined vertical position relative to the reaction rail despite substantial vertical movements of the vehicle body relative to the track, and roll control means for providing the stator roll stability.

2. A vehicle according to claim 1, wherein the roll control means are arranged for co-operation with the track at at least one area of co-operation on each side of the reaction rail.

3. A vehicle according to claim 2, wherein the vehicle is adapted for operation above the track and includes means carried by the stator for co-operation with the track at each side of the reaction rail whereby to support the stator whilst also providing the stator with stability in roll.

4. A vehicle according to claim 3, wherein the said means carried by the stator are arranged for forming and maintaining cushions of pressurized air in co-operation with the track, at least one on each side of the reaction rail.

5. A vehicle according to claim 4, wherein the said means comprise air cushion pads movably attached to the stator and arranged to be stiffer in pitch than in roll.

6. A vehicle according to claim 1, wherein the means connecting the stator to the vehicle body for independent movement with respect thereto except in a longitudinal direction comprises a pair of links extending longitudinally of the stator between the respective connection points of a first pair on the two sides of the stator and a second laterally spaced pair carried by the vehicle body, at one of their ends each link being connected to a lever arm of a respective crank, the two cranks having further lever arms interconnected by a connection therebetween and rotatable in operation to maintain the forces separately transmitted by the links substantially equal.

7. A vehicle as claimed in claim 1 wherein the guide means comprises means for forming and maintaining at least one cushion of pressurized air in co-operation with each of two opposed side surfaces of the reaction rail.

8. A vehicle as claimed in claim 1, in combination with a said prepared track.

9. The combination claimed in claim 8, wherein the reaction rail comprises a resilient mounting by which the reaction plate is mounted on the track and which allows lateral movement of the reaction plate in response to lateral forces imposed upon the reaction rail by the guide means.

10. The combination claimed in claim 9, wherein the resilient mounting allows only the said lateral movement of the said reaction plate.

11. A vehicle for operation along a prepared track and comprising a double-sided linear induction motor stator for propelling the vehicle by electro-magnetic co-operation with a generally vertical and electrically conductive reaction plate forming part of a reaction rail mounted on the track, means connecting the stator to the vehicle body for independent movement with respect thereto except in a longitudinal direction, guide means carried by the stator and adapted for co-operation with the reaction rail for maintaining the stator substantially at a predetermined lateral position relative to the reaction rail despite substantial lateral movements of the vehicle body relative to the track, the guide means being arranged so as to be incapable of transmitting any substantial rolling moment to the reaction rail, and means for supporting the stator substantially at a predetermined vertical position relative to the reaction rail despite substantial vertical movements of the vehicle body relative to the track whilst also providing the stator roll stability.

12. A vehicle for operation along a preferred track and comprising a double-sided linear induction motor stator for propelling the vehicle by electro-magnetic co-operation with a generally vertical and electrically conductive reaction plate forming part of a reaction rail mounted on the track, means connecting the stator to the vehicle body for independent movement with respect thereto except in a longitudinal direction, guide means carried by the stator and adapted for co-operation with the reaction rail between the reaction plate and the track for maintaining the stator substantially at a predetermined lateral position relative to the reaction rail despite substantial lateral movements of the vehicle body relative to the track, the guide means being arranged so as to be incapable of transmitting any substantial rolling moment to the reaction rail, and means for supporting the stator substantially at a predetermined vertical position relative to the reaction rail despite substantial vertical movements of the vehicle body relative to the track whilst also providing the stator roll stability.

13. A vehicle as claimed in claim 12 in combination with a said prepared track, wherein the reaction rail is laterally stiffer at the co-operation with the guide means than at the reaction plate.

14. A vehicle for operation along a prepared track and comprising a double-sided linear induction motor stator for propelling the vehicle by co-operation with a generally vertical and electrically conductive reaction plate forming part of a reaction rail mounted on the track, means connecting the stator to the vehicle body for independent movement with respect thereto except in a longitudinal direction, guide means carried by the stator and adapted for co-operation with the reaction rail between the reaction plate and the track for maintaining the stator substantially at a predetermined lateral position relative to the reaction rail despite substantial lateral movements of the vehicle body relative to the track, the guide means being arranged so as to be incapable of transmitting any substantial stator rolling moment to the reaction rail and comprising a plurality of wheels adapted to run on opposed side surfaces of the reaction rail in a common plane of contact between the reaction plate and the track, and means for supporting the stator substantially at a predetermined vertical position relative to the reaction rail despite substantial vertical movements of the vehicle body relative to the track while also providing the stator roll stability.

15. An air cushion vehicle for operation along and above a prepared track and comprising a double-sided linear induction motor stator for propelling the vehicle by electro-magnetic co-operation with a generally vertical and electrically conductive reaction plate forming part of a reaction rail mounted on the track, means connecting the stator to the vehicle body for independent movement with respect thereto except in a substantially longitudinal direction, air cushion means carried by the stator for forming and maintaining at least one cushion of pressurized air in co-operation with the track at each side of the reaction rail whereby to support the stator whilst also providing the stator with stability in roll, said air cushion means comprising air cushion pads movably attached to the stator and arranged for forming and maintaining the said cushions of pressurized air, and guide means carried by the stator and adapted for co-operation with the reaction rail for maintaining the stator substantially at a predetermined lateral position relative to the reaction rail, the guide means being arranged so as to be incapable of transmitting any substantial rolling moment to the reaction rail.

16. An air cushion vehicle according to claim 15 wherein the air cushion pads are arranged to be stiffer in pitch than in roll.

17. An air cushion vehicle for operation along a prepared track and comprising a double-sided linear induction motor stator for propelling the vehicle by electro-magnetic co-operation with a generally vertical and electrically conductive reaction plate forming part of a reaction rail mounted on the track, means connecting the stator to the vehicle body for independent movement with respect thereto except in a substantially longitudinal direction, guide means carried by the stator and adapted for co-operation with the reaction rail for maintaining the stator substantially at a predetermined lateral position relative to the reaction rail, the guide means being arranged so as to be incapable of transmitting any substantial rolling moment to the reaction rail, at least one generally vertical connection pivotally connected between the stator and the vehicle body on each side of the reaction rail, and control means for controlling the lengths of the connections to support the stator whilst also providing the stator with stability in roll.

18. A vehicle for operation along a prepared track and comprising a double-sided linear induction motor stator for propelling the vehicle by electro-magnetic co-operation with a generally vertical and electrically conductive reaction plate forming part of a reaction rail mounted on the track, means connecting the stator to the vehicle body for independent movement with respect thereto except in a substantially longitudinal direction, guide means carried by the stator and adapted for co-operation with the reaction rail for maintaining the stator substantially at a predetermined lateral position relative to the reaction rail despite substantial lateral movements of the vehicle body relative to the track, support means for supporting the stator substantially at a predetermined vertical position relative to the reaction rail despite substantial vertical movements of the vehicle body relative to the track, and roll control means for providing the stator roll stability.

* * * * *